J. F. KELLER.
Grain-Drill.
No 61,544. Patented Jan. 29, 1867.
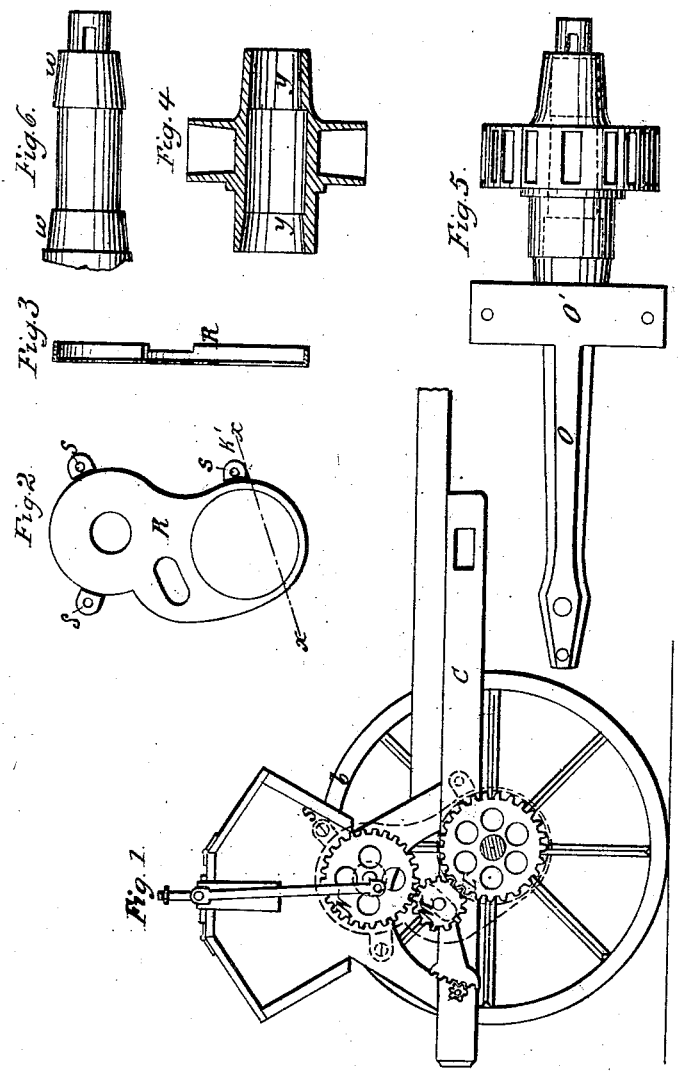

United States Patent Office.

JOHN F. KELLER, OF GREENCASTLE, PENNSYLVANIA.

Letters Patent No. 61,544, dated January 29, 1867.

---

IMPROVEMENT IN SEED PLANTERS.

---

*The Schedule referred to in these Letters Patent and making part of the same.*

---

TO ALL WHOM IT MAY CONCERN:

Be it known that I, JOHN F. KELLER, of Greencastle, in the county of Franklin, and State of Pennsylvania, have invented a new and useful Improvement in Wheat Drills and Guano Attachments; and I do hereby declare that the following is a full and exact description thereof, reference being had to the accompanying drawings, and to the letters of reference marked thereon.

My invention consists, first, in a peculiar arrangement of three gear-wheels; second, in a peculiar box or shield for protecting the same; and third, in an improved construction of axle. In the accompanying drawings—

Figure 1, is a side view of a wheat drill, showing my arrangement of the gear-wheels.

Figure 2 is a detached view of the shield or box for protecting the gearing.

Figure 3 is an edge view of the same.

Figure 4 is a section of the hub.

Figure 5 is a top view of the axle with the hub in place, the shoulders of the axle being indicated by dotted lines.

Figure 6 is a detached view of the axle-spindle.

My improved gear-shield or box for protecting the gear-wheels is represented in fig. 2, detached from the machine. It is made of cast iron, and of suitable size and form to cover the three wheels, L, M, and N, fig. 1, as indicated in red lines. It may be fastened to the frame by means of screws inserted in the ear S. The lower and front part of the box may be left open or cut away, say about up to the red line $z\,z$, fig. 2. My improved axle-arms are intended for use with a wooden axle or stock. They are provided with a peculiar bed-piece, O', which gives a secure means of fastening the same to the frame of the machine, and thus prevents the spindle from being thrown out of place by the strain in driving the gear-wheels by means of the hub. In order to prevent the spindle and box from binding, especially when worn, both the spindle and box are made with a recess in the middle and with shoulders near the ends, as seen on the spindle at $m\,m$, fig. 6, and on the box at $y\,y$, fig. 4. The gear-wheel L is attached to the hub in the usual manner, and gears into the pinion M, fig. 1. This pinion is carried on the frame of the machine and gears into a third wheel, N, which carries a crank-shaft and works the connecting-rod T, to operate the agitator of the guano attachment, as is more fully explained in a patent already granted to me.

I do not broadly claim the use of three gear-wheels, or the use of a box to enclose one or two wheels in wheat drills, but limit my claims to the above-described arrangement of these devices.

1. I claim the combination of the gear-wheel L, with the pinion M, and gear-wheel N, substantially as set forth.

2. I claim the peculiar axle O, with the bed-plate O', for fastening the axle to the frame, substantially as described.

3. I claim protecting the gear-wheels of wheat drills or seed planters against sticks, weeds, and other obstructions, by means of a box or its equivalent, substantially as described.

JOHN F. KELLER.

Witnesses:
DANIEL BREED,
EDM. F. BROWN.